United States Patent [19]

Kawamura et al.

[11] Patent Number: 5,700,153
[45] Date of Patent: Dec. 23, 1997

[54] RELAY DEVICE FOR ROTATING MEMBERS

[75] Inventors: Akihisa Kawamura; Satoshi Ishikawa; Hiroaki Iizuka, all of Shizuoka, Japan

[73] Assignee: Yazki Corporation, Tokyo, Japan

[21] Appl. No.: 582,260

[22] Filed: Jan. 3, 1996

[30] Foreign Application Priority Data

Jan. 12, 1995 [JP] Japan ................................ 7-003399

[51] Int. Cl.⁶ ............................................. H01R 35/04
[52] U.S. Cl. ..................................... 439/164; 439/15
[58] Field of Search ..................................... 439/164, 15

[56] References Cited

U.S. PATENT DOCUMENTS

| | | | |
|---|---|---|---|
| 4,824,396 | 4/1989 | Sasaki et al. | 439/15 |
| 4,844,359 | 7/1989 | Kato | 439/15 |
| 5,382,172 | 1/1995 | Klier et al. | 439/164 |
| 5,529,505 | 6/1996 | Kuramoto et al. | 439/164 |

FOREIGN PATENT DOCUMENTS

| | | |
|---|---|---|
| 61-166490 | 10/1986 | Japan . |
| 1-92090 | 6/1989 | Japan . |

Primary Examiner—Gary F. Paumen
Attorney, Agent, or Firm—Finnegan, Henderson, Frabow, Garrett & Dunner, L.L.P.

[57] ABSTRACT

A relay device includes a first rotor having an inner cylinder, a second rotor having an outer cylinder and a cover attached to the inner cylinder. A flexible flat cable is accommodated in an annular space defined between the inner cylinder and the outer cylinder. The inner cylinder is provided with a shroud part for retaining the end portion of the flexible flat cable therein while the cover is provided with a press part. The press part is arranged so that, when the cover is attached to the inner cylinder, the press part is brought into contact with the shroud part from the outside. Therefore, the press part urges the inner end portion of the cable against the inner cylinder, whereby the inner end portion of the cable can be fixed on the inner cylinder securely.

5 Claims, 9 Drawing Sheets

RELAY DEVICE FOR ROTATING MEMBERS

BACKGROUND OF THE INVENTION

1. Technical Field

The present invention relates to a relay device for accomplishing an electrical connection between relatively rotating members through the intermediary of a flexible flat cable.

2. Description of the Related Art

This kind of relay device is disclosed in Japanese Unexamined Utility Model publication (kokai) Nos. 61-166490 and 1-92090 etc. In these publications, the relay device includes a first rotor having an inner cylinder, a second rotor having an outer cylinder surrounding the inner cylinder of the first rotor through an annular space and a flexible flat cable accommodated in the annular space defined between the inner cylinder and the outer cylinder in a spirally wound manner, which will be also referred as "cable", hereinafter. The cable has an inner end portion carried by the inner cylinder of the first rotor and withdrawn outside from the inner cylinder and an outer end portion carried by the outer cylinder and withdrawn outside from the outer cylinder.

Further, the inner cylinder is provided with an attachment ring for attaching the cable to the inner cylinder. In attaching the cable, by fitting the attachment ring on the cable while the inner end portion of the cable is wound about the inner cylinder, an operator can fix the cable to the inner cylinder.

In the above-mentioned relay device, however, the inner cylinder is positioned inside of the cable wound cylindrically, so that it is difficult to fit the attachment ring on the outer periphery of the inner cylinder. Thus, the conventional relay device has a great disadvantage in terms of workability in assembling the relay device. In addition, since the cable is apt to be deviated from a normal position in attaching the attachment ring, there would be caused a problem of difficulty in fixing the inner end portion of the flexible flat cable in a regular position on the inner cylinder.

SUMMARY OF THE INVENTION

It is therefore an object of the present invention to provide a relay device which is capable of securely fixing an inner end portion of a flexible flat cable to an inner cylinder in position.

The object of the present invention described above can be accomplished by a relay device comprising a first rotor having an inner cylinder;

a second rotor arranged so as to rotate with respect to the first rotor relatively, the second rotor having an outer cylinder surrounding the inner cylinder through a predetermined distance, either one of the first and second rotors being immovably arranged while the other of the first and second rotors is arranged movably so as to rotate within a predetermined rotational span;

a flexible flat cable accommodated in an annular space defined between the inner cylinder and the outer cylinder, the flexible flat cable being spirally wound and having an end portion carried by the inner cylinder and the other end portion carried by the outer cylinder; and a cover attached to an axial end of the inner cylinder so that one end of the flexible flat cable is drawn out of the annular space;

wherein the inner cylinder is provided with a shroud part for retaining the end portion of the flexible flat cable therein; and wherein the cover is provided with a press part which serves to force the end portion of the flexible flat cable to the inner cylinder per se when the cover is attached to the inner cylinder.

With the arrangement mentioned above, by inserting the inner end portion of the flexible flat cable between the inner cylinder and the shroud part, the inner end portion can be temporarily fixed in position of the inner cylinder. Under such a condition, when the cover is attached on the axial end of the inner cylinder, the press part urges the inner end portion of the cable against the inner cylinder. Therefore, the inner end portion of the cable can be fixed on the inner cylinder securely.

In the present invention, preferably, the press part is arranged so that, when the cover is attached to the inner cylinder, the press part is brought into contact with the shroud part from the outside.

In such a case, since the inner end portion of the cable is interposed between the urged shroud part and the inner cylinder, so that it is possible to fix the inner portion therebetween more securely.

Alternatively, it is preferable that the press part is arranged so that, when the cover is attached to the inner cylinder, the press part is inserted between the inner cylinder and the shroud part.

In such a case, since the inner end portion of the cable is interposed between the press part and the inner cylinder, the cable can be secured therebetween more securely.

According to the present invention, there is also provided a relay device comprising:

a first rotor having an inner cylinder;

a second rotor arranged so as to rotate with respect to the first rotor relatively, the second rotor having an outer cylinder surrounding the inner cylinder through a predetermined distance, either one of the first and second rotors being arranged immovably while the other of the first and second rotor is arranged movably so as to rotate within a predetermined rotational span;

a flexible flat cable accommodated in an annular space defined between the inner cylinder and the outer cylinder, the flexible flat cable being spirally wound and having an end portion carried by the inner cylinder and the other end portion carried by the outer cylinder;

a cover attached to an axial end of the inner cylinder so that one end of the flexible flat cable is drawn out of the annular space; and a ring body attached on the inner cylinder of the first rotor, the ring body being provided on an outer periphery thereof with a holding part for retaining the end portion of the flexible flat cable;

wherein the cover is provided with a press part which serves to force the end portion of the flexible flat cable to the inner cylinder per se when the cover is attached to the inner cylinder.

With the arrangement mentioned above, by inserting the inner end portion of the flexible flat cable between the inner cylinder and the holding part of the ring body, the inner end portion can be temporarily fixed in position of the inner cylinder. Under such a condition, when the cover is attached on the axial end of the inner cylinder, the press part urges the inner end portion of the cable against the inner cylinder. Therefore, the inner end portion of the cable can be fixed on the inner cylinder securely.

In the present invention, preferably, the press part is arranged so that, when the cover is attached to the inner cylinder, the press part is brought into contact with the holding part from the outside.

In such a case, since the inner end portion of the cable is interposed between the urged holding part and the inner cylinder, it is possible to fix the inner portion therebetween more securely.

Alternatively, it is preferable that the press part is arranged so that, when the cover is attached to the inner cylinder, the press part is inserted between the inner cylinder and the holding part.

In such a case, since the inner end portion of the cable is interposed between therapies part and the inner cylinder, the cable can be secured therebetween more securely.

These and other objects and features of the present invention will become more fully apparent from the following description and appended claims taken in conjunction with the accompany drawing.

DESCRIPTION OF THE PREFERRED EMBODIMENT

A variety of embodiments of the present invention will be described with reference to FIGS. 1 to 12. First of all, we now describe a first embodiment of the present invention with reference to FIGS. 1 to 4.

Figure 4:
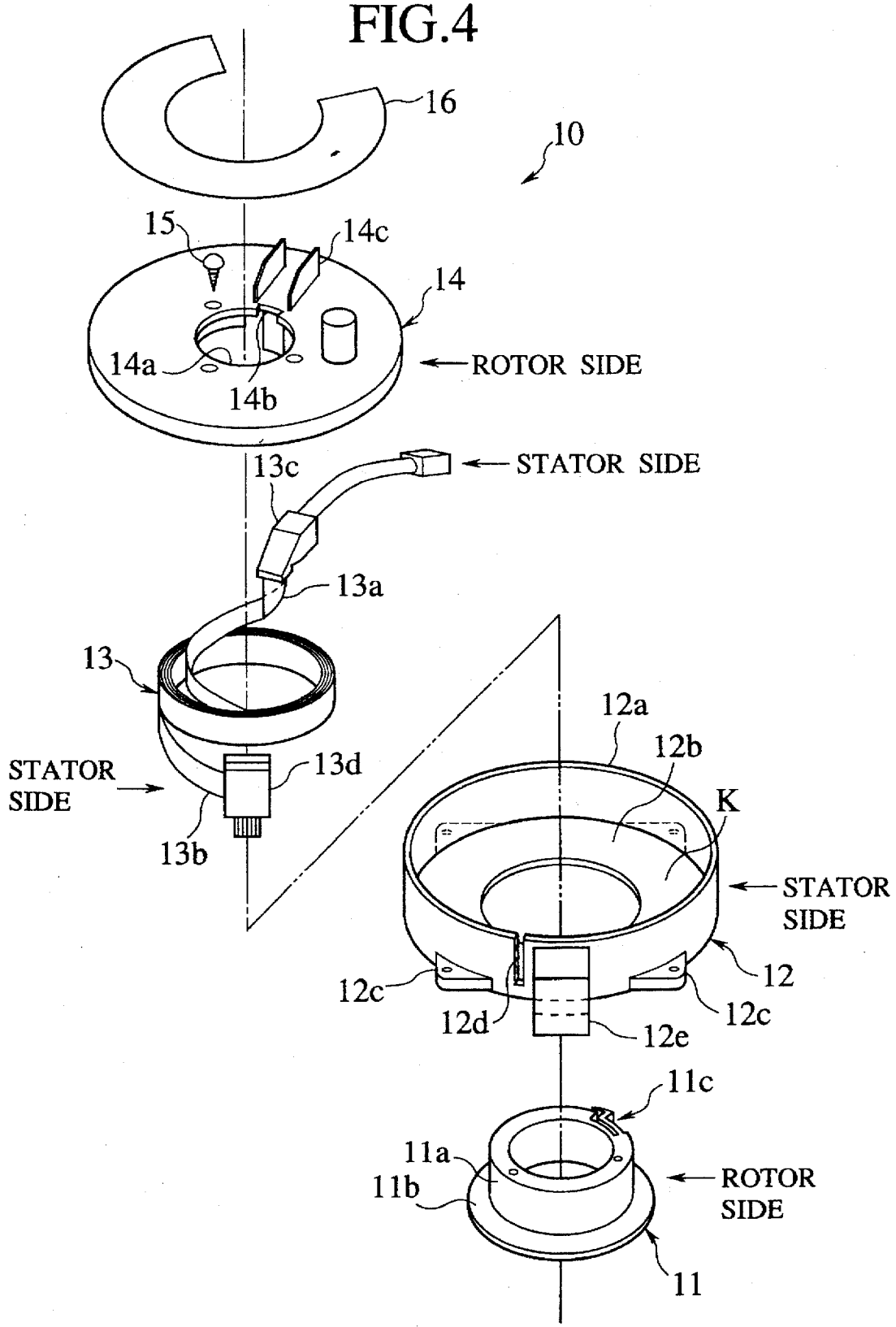
FIG. 4 is a perspective view of the relay device of FIG. 1 in an disassembled condition.

As shown in FIG. 4, a relay device 10 includes a first rotor 11 having an inner cylinder 11a and a flange 11b extending from a lower end of the inner cylinder 11a radially outwardly and a second rotor (stator) 12 having an outer cylinder 12a surrounding the inner cylinder 11a through a predetermined distance and an annular bottom plate 12b extending from a lower end of the outer cylinder 12a inwardly along an upper face of the flange 11b.

The relay device 10 further includes a flexible flat cable 13 and an upper cover 14. The flexible flat cable 13 is accommodated in an annular space K defined between the inner cylinder 11a and the outer cylinder 12a in a spirally wound manner, having one end supported by the inner cylinder 11a and the other end supported by the outer cylinder 12a. The upper cover 14 is attached to one end of the inner cylinder 11a to close an opening of the space K and arranged so as to draw out an inner end portion 13a of the flexible flat cable 13.

The inner cylinder 11a is provided with a shroud part 11e for supporting the inner end portion 13a of the flexible flat cable 13. The upper cover 14 is provided with a press part 14d. Under condition that the upper cover 14 is attached to the inner cylinder 11a, the press part 14d operates to press the shroud part 11e against the inner cylinder 11a, together with the inner end portion 13a of the flexible flat cable 13.

We now describe the above-mentioned arrangement in detail.

Figure 1:
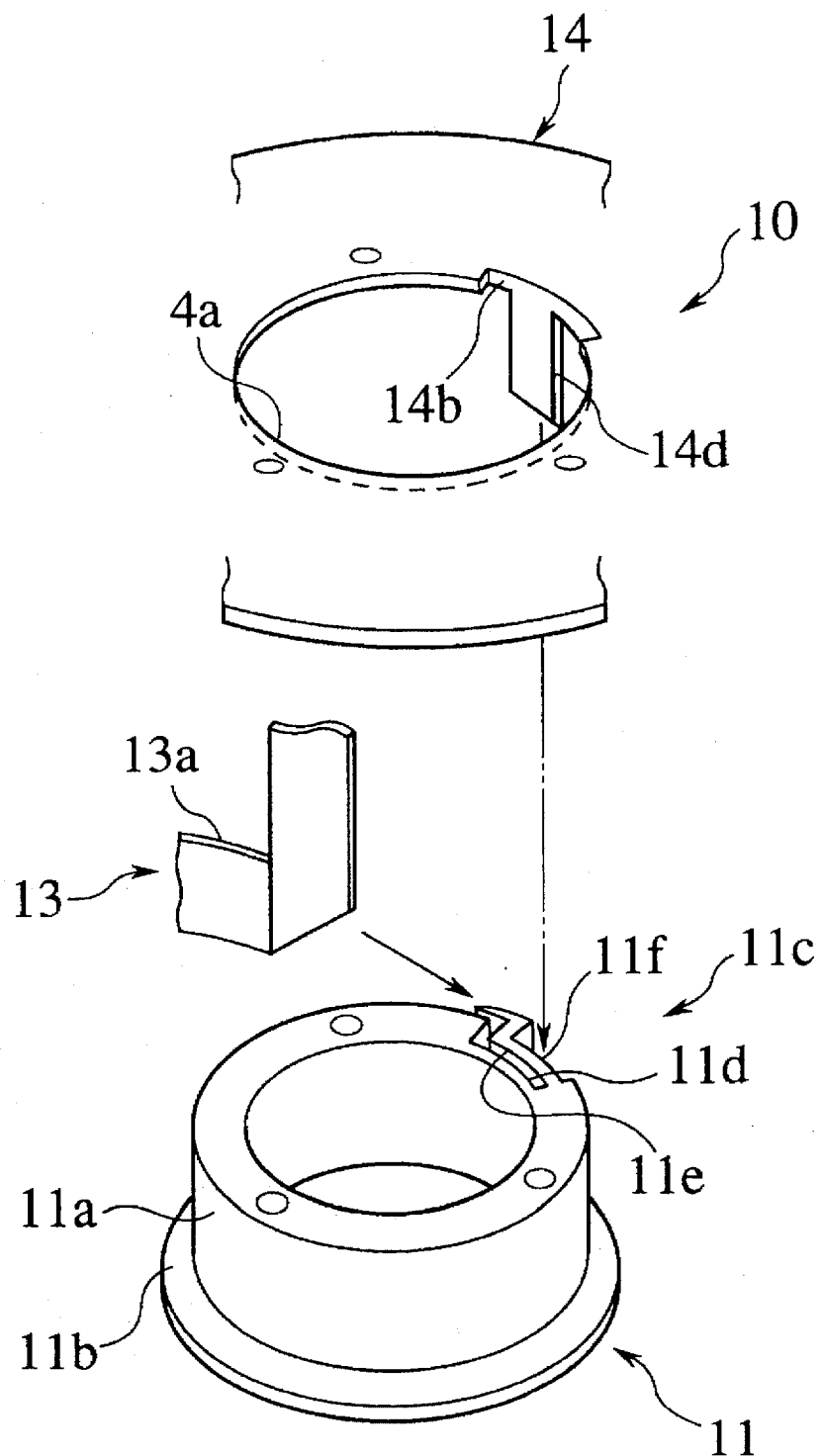
FIG. 1 is a perspective view of a relay device between rotating members in accordance with a first embodiment of the present invention, in which an essential part of the device is disassembled.

As shown in FIG. 1, being provided with the inner cylinder 11a and the flange 11b, the first rotor 11 is associated with a rotating member such as a steering wheel constituting a handle section of an automobile. The inner cylinder 11a is provided on an outer periphery thereof with a holding part 11c for holding the inner end portion 13a of the flexible flat cable 13.

Figure 2:
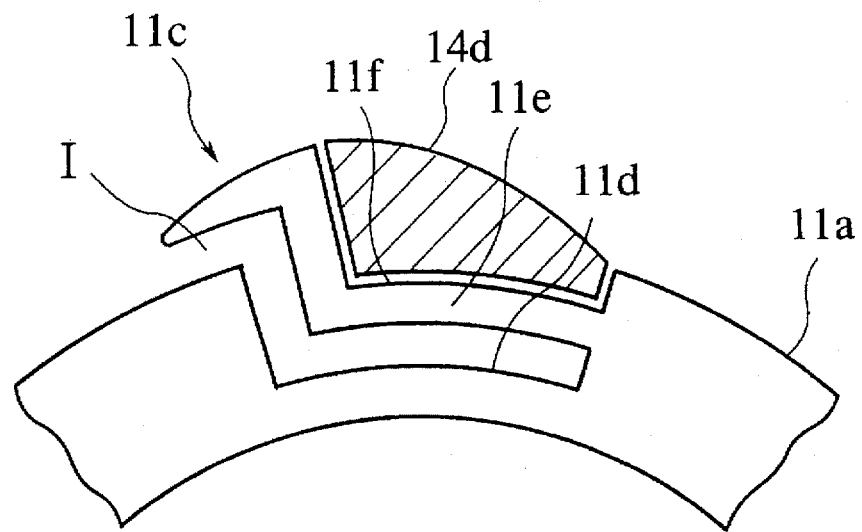
FIG. 2 is a plan view showing an essential part of a rotational holding portion of an inner cylinder of the relay device of FIG. 1.
Figure 3:
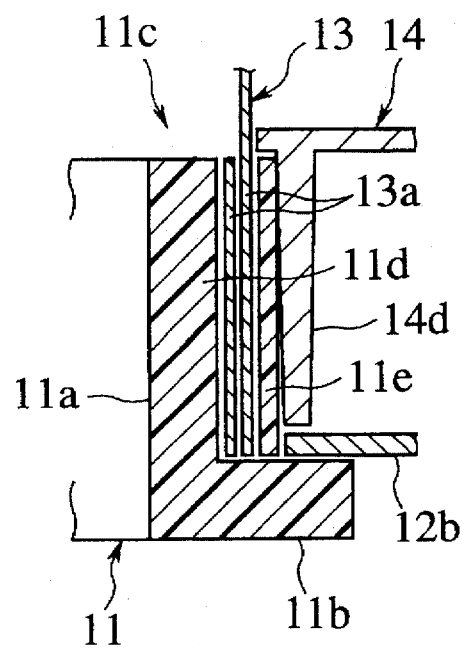
FIG. 3 is a cross sectional view showing the essential part of the rotational holding portion of the inner cylinder of the relay device of FIG. 1.

As shown in FIGS. 2 and 3, the holding part 11c includes an engagement groove 11d which is formed so as to extend in an axial direction of the inner cylinder 11a and the shroud part 11e which is formed along the outer peripheral surface of the inner cylinder 11a so as to overlay the groove 11d from one margin thereof upto the other margin. The shroud part 11e in the form of cantilever has a step-shaped free end formed so as to be apart from the other margin of the engagement groove 11d by a predetermined clearance. Consequently defined between the free end of the shroud part 11e and the other margin of the engagement groove 11d is a step-shaped opening I through which the inner end portion 13a of the flexible flat cable 13 is to be inserted into the engagement groove 11d.

Further, the inner cylinder 11a is provided adjacent to the shroud part 11e with a concave portion for engagement with the press part 14, providing a pressed surface 11f for receiving pressure therefrom.

The second rotor 12 as the stator is connected to a not-shown fixed member, such as a steering column of the handle section of the automobile, through the Intermediary of blankets 12c shown in FIG. 4. The outer cylinder 12a has a slit 12d formed to hold an outer end portion 13b of the cable 13 and to draw out it for the fixed member. Further, the outer cylinder 12a is provided with a holder 12e for holding a connector 13d on the stator side, which will be described later.

As shown in FIG. 4, the flexible flat cable 13 has the inner end portion 13a bent upwardly at right angles. In arrangement, being inserted into the engagement groove 11d, this bent part (i.e., the inner end portion 13a) of the cable 13 is retained between a part of the inner cylinder 11a and the shroud part 11e. Further, a terminal of the inner end portion 13a of the cable 13 is to be electrically connected to a connector 13c on the rotor side.

On the other hand, the outer end 13d is drawn out through the slit 12d formed in the second rotor 12 and a terminal of the outer end 13d is connected to a connector 13d on the stator side. The connector 13d is carried by a holder 12e mounted on the second rotor 12.

As shown in FIG. 4, the upper cover 14 is provided with a through hole 14a which is coaxial with the inner cylinder 11a. The upper cover 14 is fixed to an upper end of the inner cylinder 11a through screws 15. The through hole 14a has a notch 14b formed in a position corresponding to the holding part 11c of the inner cylinder 11a to draw out the inner end portion 13a of the flexible flat cable 13. Further, the upper cover 14 is provided on an upper surface thereof with a holder 14c (the rotor side) for holding the connector 13c connected to the inner end portion 13a of the cable 13 and provided on the upper surface with a label 16 on which matters to-be attend or the like are written.

Furthermore, the upper cover 14 is provided on a lower surface thereof with the press part 14d which exerts a pressure on the pressed surface 11f under condition that the upper cover 14 is secured on the upper end of the inner cylinder 11a. As shown in FIGS. 1 to 3, the press part 14d serves to urge the shroud part 11e against a bottom of the engagement groove 11d together with the inner end portion 13a of the flexible flat cable 13 thereby to fix the inner end portion 13a on the groove 11d. The press part 14d is shaped so as to gradually get thinner in a tapered manner as it directs downwardly. Thus, the arrangement allows a lower end of the press part 14d to be inserted between the pressed surface 11f and the flexible flag cable 13 easily. In addition, as shown in FIG. 2, an outer surface of the press part 14d is formed smoothly so as to provide a curved surface which is continuous with an outer surface of the inner cylinder 11a.

In order to assemble the relay device 10, upon mounting the lowermost first rotor 11 on a working table for assembling the device 10 at first, the second rotor 12 is then put on the first rotor 11. Thus, the annular bottom plate 12b of the second rotor 12 is mounted on the flange 11b of the first rotor 11 thereby to define an annular space K between the inner cylinder 11a and the outer cylinder 12a. Then, the spirally wound flexible flat cable 13 is accommodated in the annular space K.

Next, the bend inner end portion 13a of the cable 13 is fixed to the holding part 11c of the inner cylinder 11a temporarily. This temporary fixing of the inner end portion 13a to the first rotor 11 is carried out by inserting the inner end 11a between the engagement groove 11d and the shroud part 11e.

Then, the outer end portion 13b of the cable 13 is drawn out of the slit 12d of the outer cylinder 12a while being held by the slit 12d, so that the connector 13d on the stator side is attached to the holder 12e on the stator side.

Next, while mounting the upper cover 14 on the upper end of the inner cylinder 11a, the inner end portion 13a of the flexible flat cable 13 and the connector 13c on the rotor side are drawn through the through hole 14a upwardly. At this time, the press part 14d is adjusted to suit the pressed surface 11f of the holding part 11a. Further, by fixing the upper cover 14 on the upper end of the inner cylinder 11a, the connector 13 on the rotor side is attached on the holder 14c.

Consequently, since the press part 14d exerts pressure on the pressed surface 11f as shown in FIG. 3, the shroud part 11e and the inner end portion 13a of the flexible flat cable 13 are urged against the bottom part of the engagement groove 11d, so that the inner end portion 13a can be fixed in a predetermined position of the inner cylinder 11a securely.

Apropos of this fixing, it should be noted that although the engagement groove 11d, the inner end portion 13a and the shroud part 11e are respectively illustrated in FIG. 3 so as to be apart from each other in order to show these elements clearly, they are stuck with each other by pressing from the press part 14d in fact. In this state, the inner end portion 13a of the flexible flat cover 13 is drawn upwardly through the upper cover 14 while the upper end of the outer cylinder 12a is covered with the upper cover 14. Finally, the label 18 is pasted on the upper surface of the upper cover 14, whereby the assembling of the relay device 10 can be completed.

According to the relay device 10 mentioned above, not only does it allow the inner end portion 13a of the cable 13 to be temporarily fixed in the predetermined position of the inner cylinder 11a owing to the engagement groove 11d and the shroud part 11e, but it allows such a temporarily fixed inner end portion 13a to be fixed in the position by means of the press part 14d securely. That is, it is possible to fix the inner end portion 13a of the cable 13 in place of the inner cylinder 11a easily and securely.

Figure 5:
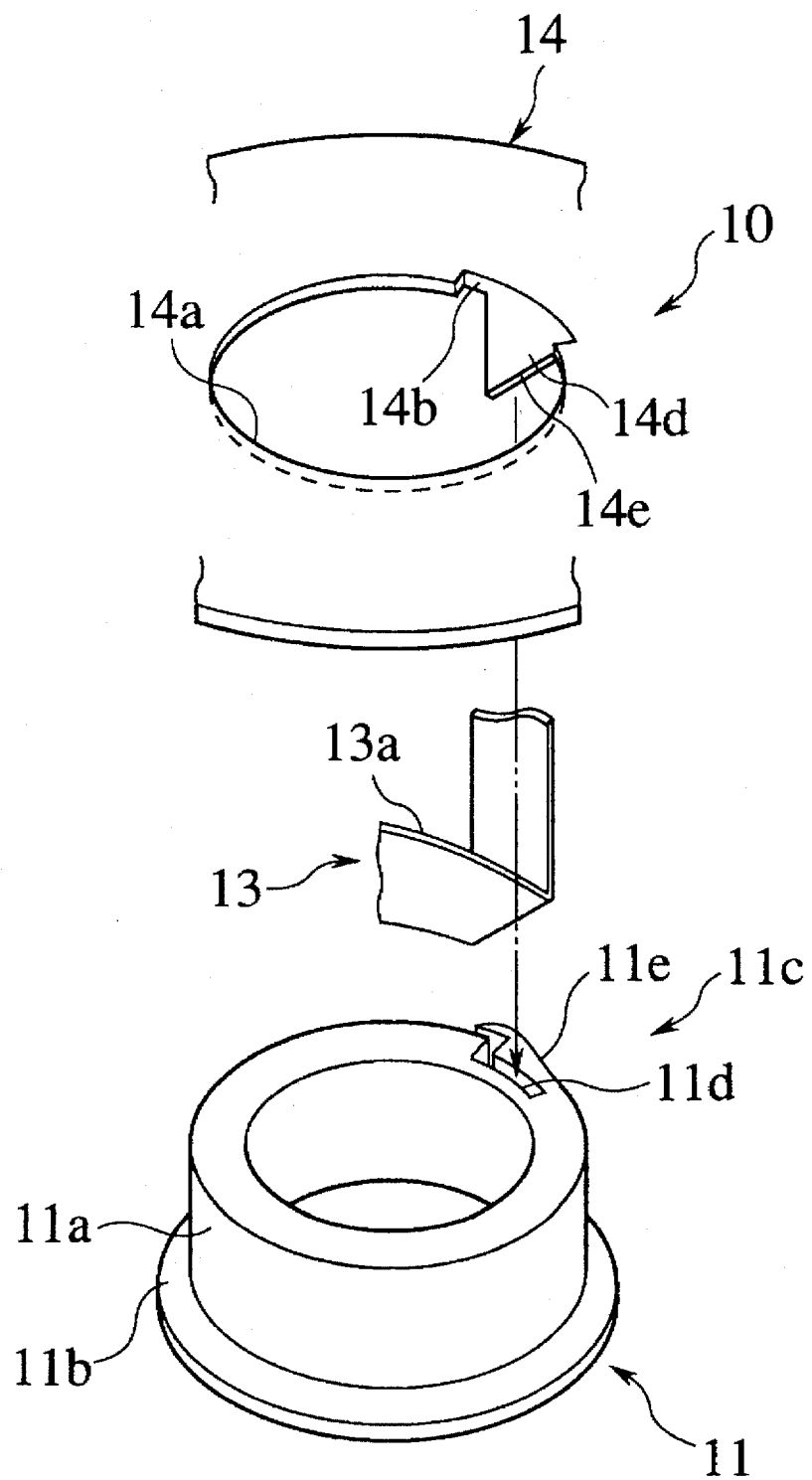
FIG. 5 is a perspective view of a relay device between rotating members in accordance with a second embodiment of the present invention, in which an essential part of the device is disassembled.
Figure 6:
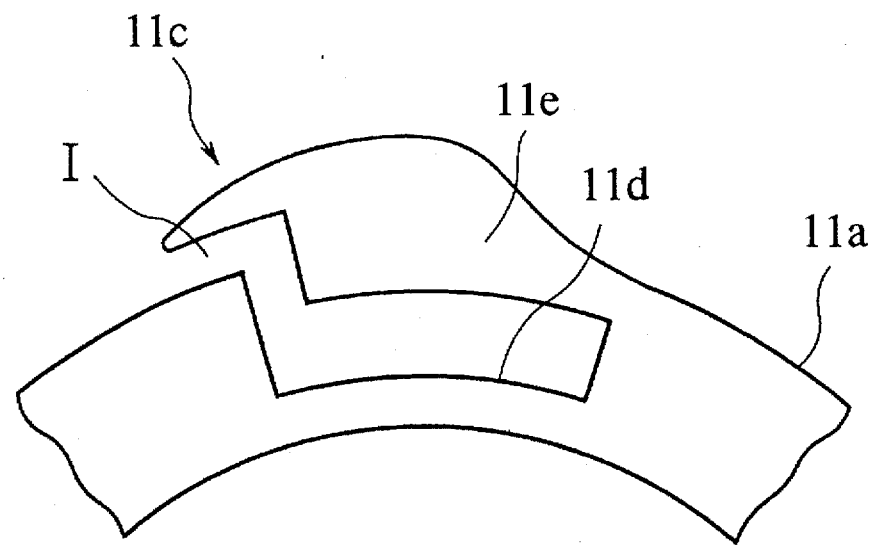
FIG. 6 is a plan view showing an essential part of a rotational holding portion of a ring body of the relay device of FIG. 5.
Figure 7:
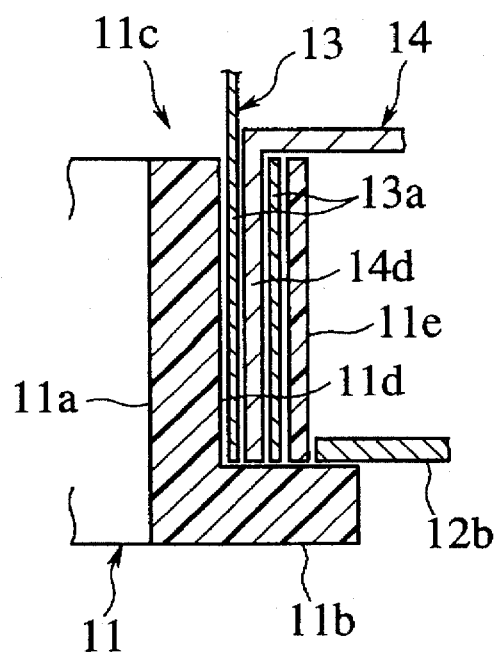
FIG. 7 is a cross sectional view showing the essential part of the rotational holding portion of the ring body of the relay device of FIG. 5.

We now describe a second embodiment of the present invention with reference to FIGS. 5 to 7. Note, in this embodiment, elements common to those in the first embodiment are indicated by the same reference numerals, whereby their descriptions are deleted. A difference between the second embodiment and the first embodiment resides in that the press part 14d of the embodiment is accommodated in the engagement groove 11d to fix the inner end 13d of the flexible flat cable 13 therein.

In detail, on the outer peripheral surface of the shroud part 11e, there is not provided the above pressed surface of the first embodiment, which is indicated by reference numeral 11f in FIG. 2, but a smooth curved surface formed along the outer peripheral surface of the inner cylinder 11a, as shown in FIG. 6. Further, the press part 14d is inserted between overlapping parts resulting from bending of the inner end portion 13a at right angles, so that the inner end portion 13a can be urged against the bottom part of the engagement groove 11d and the shroud 11e. The press part 14d has a slanted notch 14e (FIG. 5) formed so as to accord with a tuning line inclined by about 45° of the inner end portion 13a. Also in this embodiment, it should be noted that although the engagement groove 11d, the inner end portion 13a and the shroud part 11e are respectively illustrated in FIG. 7 so as to be apart from each other in order to show these elements clearly, they are stuck with each other by pressing from the press part 14d in fact.

In the relay device 10 mentioned above, the arrangement where the upper cover 14 is fixed on the upper end of the inner cylinder 11a allows the press part 14d to be inserted into the overlapped portions of the inner end portion 13a, thereby causing it to be urged against the engagement groove 11d and the shroud part 11e. Moreover, since the slanted notch 14e of the press part 14d abuts on the turning line at an angle of 45° with the inner end portion 13a, not only does the arrangement allow the inner end portion 13a to be positioned securely, but it is possible to fix the inner end portion 13a on the inner cylinder 11a certainly. Other operations and effects derived therefrom in the embodiment are similar to those in the first embodiment.

A third embodiment of the present invention will be described hereinafter with reference to FIGS. 8 to 11. Also in this embodiment, elements common to those in the first embodiment are indicated by the same reference numerals and their descriptions are deleted. A difference between the third embodiment and the first embodiment resides in that the inner cylinder 11a is provided on the outer peripheral surface with a ring body 17 by which the inner end portion 13a of the flexible flat cable 13 is fixed to the inner cylinder 11a.

Figure 8:
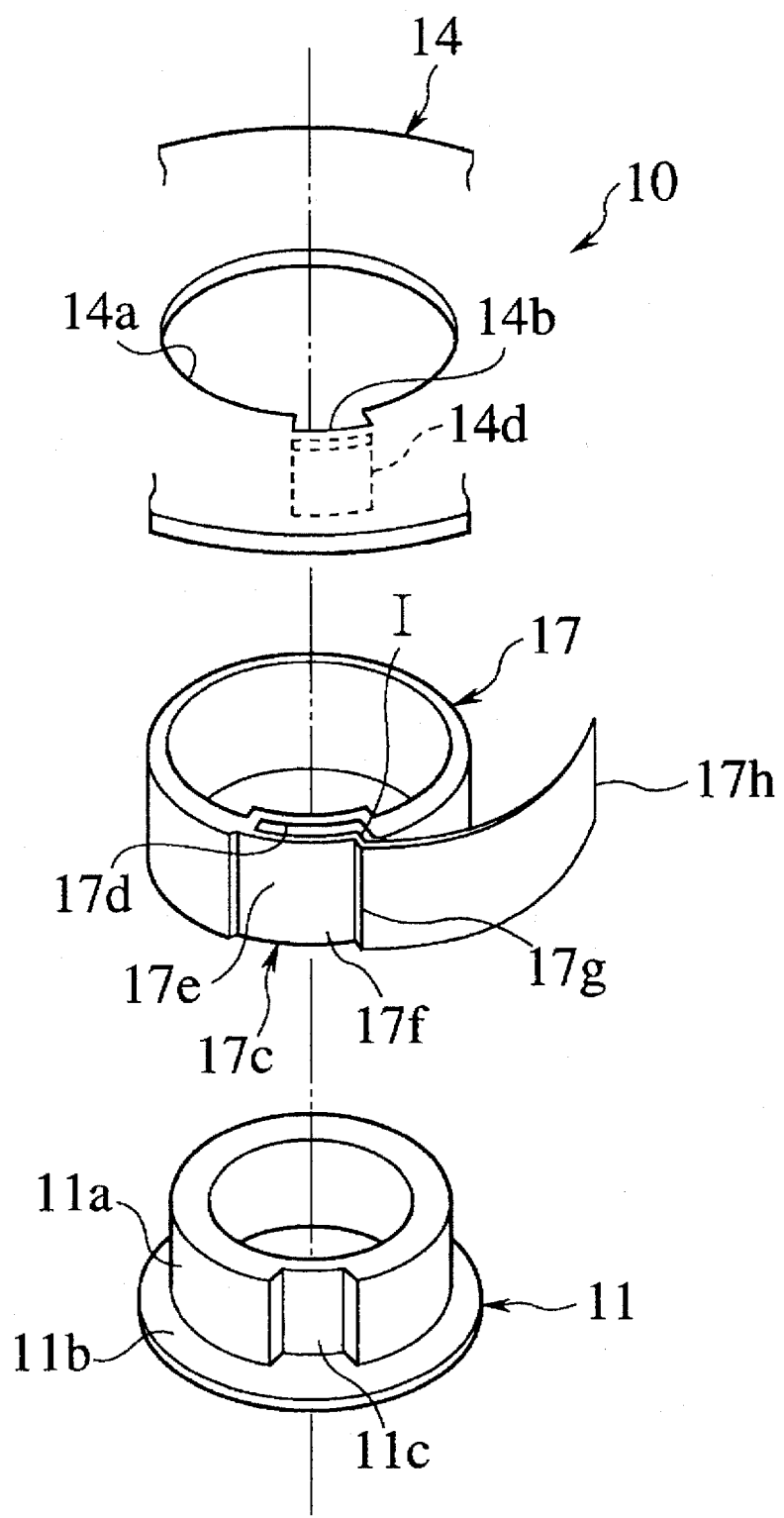
FIG. 8 is a perspective view of a relay device between rotating members in accordance with a third embodiment of the present invention, in which an essential part of the device is disassembled.
Figure 9:
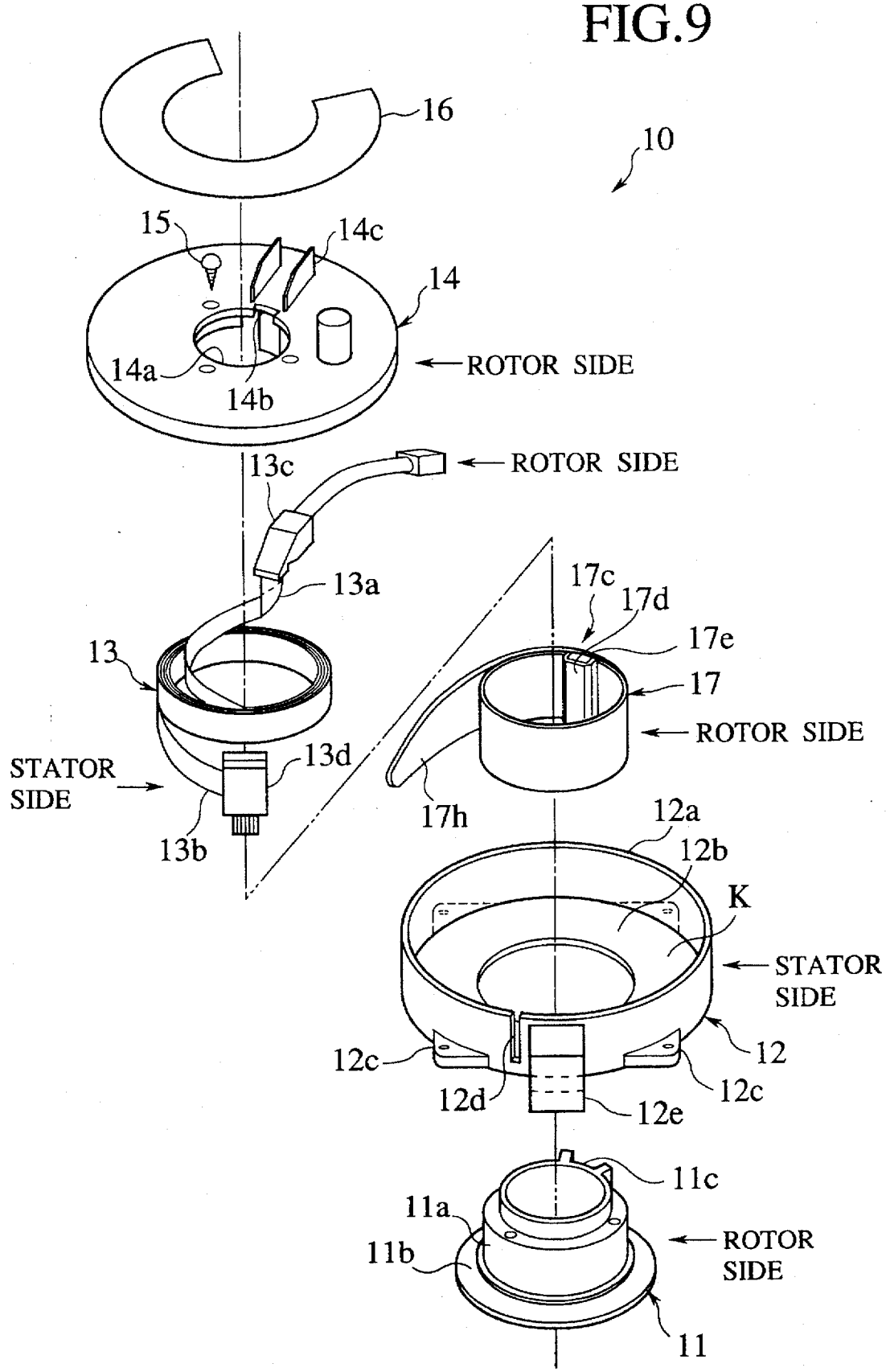
FIG. 9 is a perspective view of the relay device of FIG. 8 in an disassembled condition.
Figure 10:
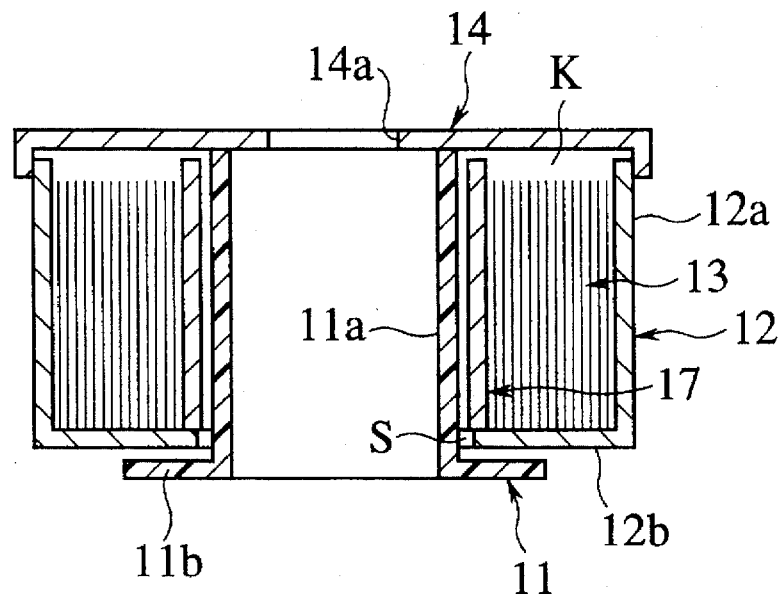
FIG. 10 is a cross sectional view showing of the relay device of FIG. 8.

That is, the ring body 17 is shaped to be cylindrical as shown in FIGS. 8 to 10, having an outer peripheral surface thereof formed so as to be outside of the inner peripheral edge of the annular bottom plate 12b. Further, the ring body 17 is provided on the outer peripheral surface with a holding part 17c (on the rotor side) for holding the inner end portion 13a of the flexible flat cable 13.

As shown in FIG. 8, the holding part 17 includes an engagement groove 17d shaped to be concave along an axis of the ring body 17 and a shroud part 17e extending so as to surround the engagement groove 17d from one margin thereof through the other margin. The shroud part 17e, which extends from the margin of the engagement groove 17d in form of cantilever, is composed of a step part 17g formed so as to be apart from the other margin of the engagement groove 17d at predetermined intervals and a tongue part 17h formed so as to extend from the step part 17g toward a tip of the holding part 17c. Further, a space between the step part 17g and the other margin of the engagement groove 17d is defined so as to provide a step-shaped opening I through which the inner end portion 13a of the flexible flat cable 13 is to be inserted into the engagement groove 17d.

The tongue part 17h in form of an arc along the ring body 17 is formed so as to be gradually apart from the outer peripheral surface of the ring body 17 as it approaches a tip of the part 17h, in order to guide the inner end portion 13a of the flexible flat cable 13 into the engagement groove 17d. Furthermore, the tongue part 17h is adapted in such a manner that, in case that the ring body 17 rotates in the direction for compressing the cable 18, the part 17h serves to prevent the cable 13 from being folded in the direction opposite to the rotating direction of the ring body 17. On the outer periphery of the shroud 17e, a pressured surface 17f is formed for receiving a force from the pressing part 14d, corresponding to the engagement groove 17d.

On the other hand, the inner cylinder 11a of the rotor 11 is provided on an outer peripheral surface thereof with an engagement recess 11c for engagement with the engagement groove 17d, as shown in FIG. 8. Note, it will be understood that the engagement recess 11c of the embodiment is provided instead of the holding part 11c of FIG. 4 in the first embodiment.

Abutting on the pressed surface 17f, the press part 14d arranged on the upper cover 14 operates to urge the shroud part 17e against a bottom of the engagement groove together with the inner end portion 13a of the flexible flat cable 17 thereby to fix it on the ring body 17.

Figure 11:
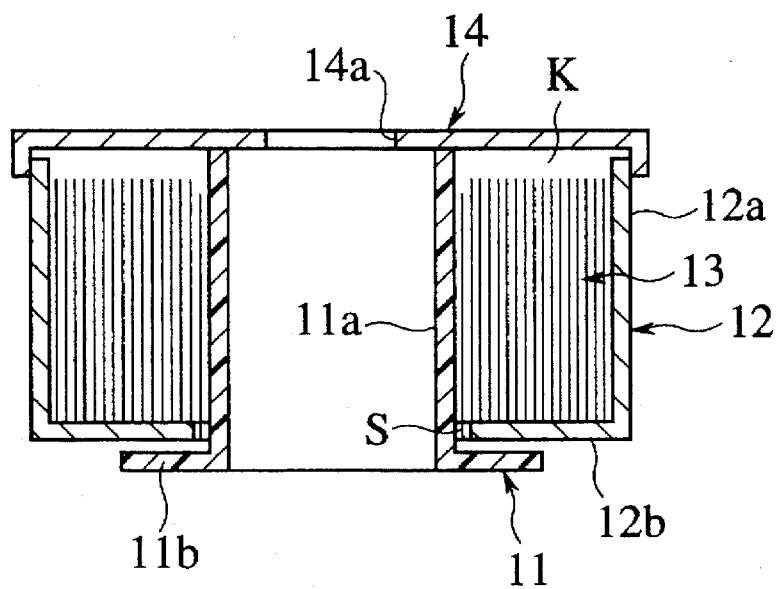
FIG. 11 is a cross sectional view of the relay device of FIG. 8 without a ring body, explaining an effect of the ring body of the device.

Consequently, the relay device 10 of this embodiment has also operations and effects similar to those in the first embodiment. Note, in the embodiment, the ring body 17 is so arranged that the outer peripheral surface is outside of the inner margin of the annular bottom plate 12b. Thus, even if there is produced a clearance S between the inner edge of the annular bottom plate 12b and the outer peripheral surface of the inner cylinder 11a as shown in FIG. 11, it is possible to cover the clearance S with the ring body 17 as shown in FIG. 10. Therefore, it is possible to prevent the flexible flat cable 13 from being caught in the clearance S and damaged therein.

Moreover, owing to the arrangement where the inner end portion 13a of the cable 13 is carried by the holding part 17c of the ring body 17, the previous winding of the flexible flat cable 13 about the ring body 17 allows the ring body 17 to be attached to the inner cylinder 11a. In other wards, according to the embodiment, it is possible to attach the flexible flat cable 13 to the inner cylinder 11a more easily.

Figure 12:
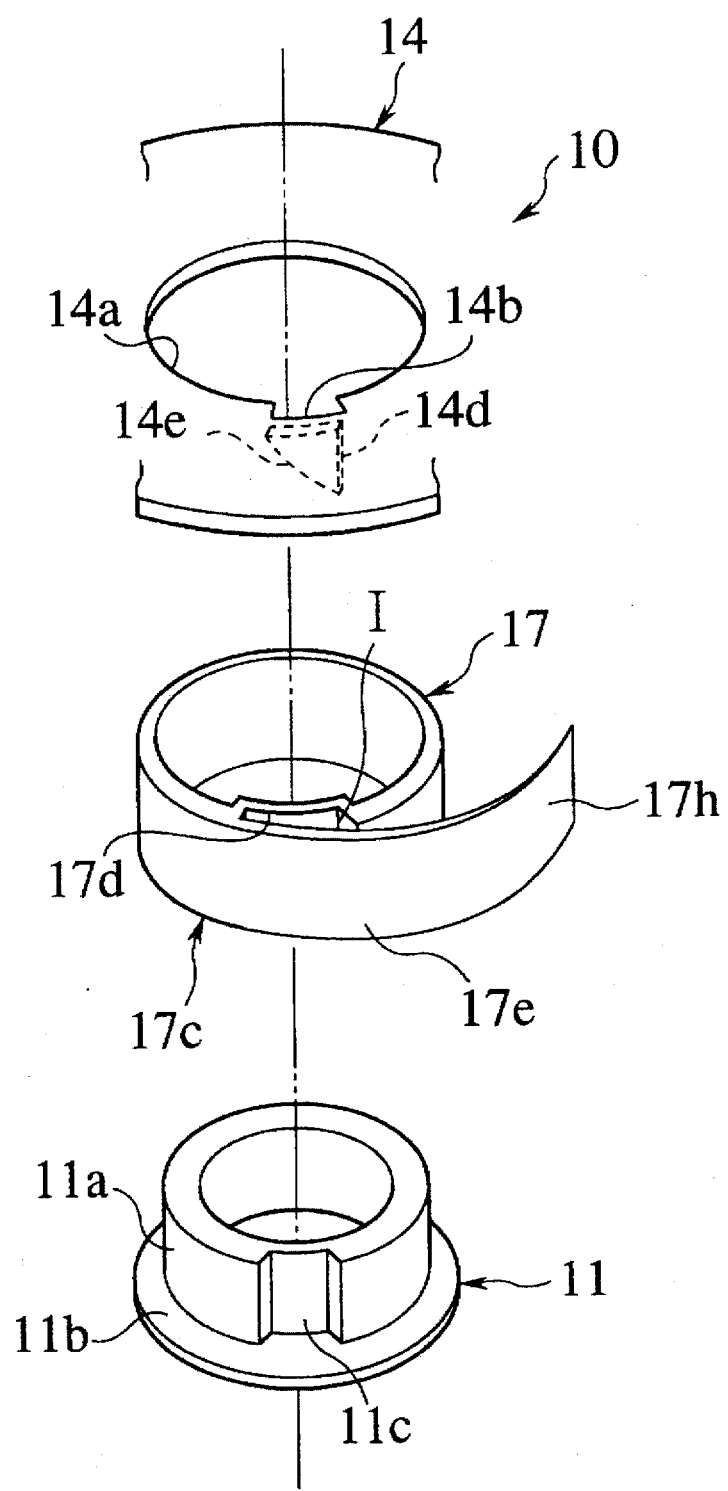
FIG. 12 is a perspective view of a relay device between rotating members in accordance with a fourth embodiment of the present invention, in which an essential part of the device is disassembled.

Next, a fourth embodiment of the invention will be described with reference to FIG. 12. Also in this embodiment, elements common to those in the third embodiment are indicated by the same reference numerals and their descriptions are deleted. A difference between the fourth embodiment and the third embodiment resides in that the press part 14d is inserted into the engagement groove 17d thereby to fix the inner end portion 13a of the cable 13 to the ring body 17 in the embodiment.

In detail, the shroud part 17e of the embodiment is not provided on the outer peripheral surface with the pressed surface 11f as shown in FIG. 8, but a curved surface extending from the outer peripheral surface of the inner cylinder 11a in succession. In assembly, the press part 14d is inserted between overlapping parts resulting from the folded inner end portion 13a at right angles, so that the part 14d presses the inner end portion 13a against the engagement groove 17d and the shroud lye. Further, the press part 14d has the slanted notch 14e formed so as to accord with a tuning line inclined by about 45° of the inner end portion 13a.

In the relay device 10 mentioned above, a fixing of the upper cover 14 on the upper end of the inner cylinder 11a allows the press part 14d to be inserted into the overlapping parts of the inner end portion 13a, whereby it can be urged against the engagement groove 17d and the shroud part lye. Moreover, since the slanted notch 14e of the press part 14d abuts on the turning line at an angle of 45° to the inner end portion 13a, not only does the arrangement allow the inner end portion 13a to be positioned securely, but it is possible to fix the inner end portion 13a on the inner cylinder 11a certainly. Other operations and effects derived therefrom in the embodiment are similar to those in the third embodiment.

It is noted that although the press part 14d is adapted so as to be inserted between the folded inner end portion 13a (the overlapping parts) in the above-mentioned second and fourth embodiments, the part 14d may be inserted between the inner end portion 13a and the engagement groove (11d or 17d) or between the inner end portion 13a and the shroud part (11e or 17e) in a modification. In such a case, it is preferable that, in order to fix the flexible flat cable 13 to the rotor 11, the press part 14d is so arranged that the slanted notch 14e abuts on the turning line at an angle of 45° to the inner end portion 13a while the part 14d is inserted between the inner end portion(s) 13a.

In addition, although the first rotor is coupled to the rotating member while the second rotor is coupled to the fixed member in the above-mentioned embodiments, the first rotor may be connected to the fixed member while the second rotor is connected to the fixed member in the modification.

Finally, it will be understood by those skilled in the art that the foregoing description is one of preferred embodiments of the disclosed relay device, and that various changes and modifications may be made to the present invention without departing from the spirit and scope thereof.

What is claimed:

1. A relay device comprising:
    a first rotor having an inner cylinder with an axial end;
    a second rotor having an outer cylinder surrounding said inner cylinder at a distance to provide an annular space between the inner and outer cylinders, one of said first and second rotors being immovable while the other of said first and second rotors is rotatable within a predetermined rotational span;

a flexible flat cable accommodated in the annular space, said flexible flat cable being spirally wound and having one end portion carried by said inner cylinder and another end portion carried by said outer cylinder; and a cover attachable to the axial end of said inner cylinder so that the one end of said flexible flat cable is drawn out of said annular space;

said inner cylinder having shroud part for retaining said one end portion of said flexible flat cable therein; and skid cover having a press part engageable with said shroud part to force said one end portion of said flexible flat cable against said inner cylinder when said cover is attached to said inner cylinder.

2. A relay device as claimed in claim 1, wherein said press part is arranged so that, when said cover is attached to said inner cylinder, the press part is brought into contact with an outer side of the shroud part.

3. A relay device as claimed in claim 2, wherein said inner cylinder and said shroud part provide an engagement groove for retaining said end portion of said flexible flat cable therein.

4. A relay device as claimed in claim 3, wherein said inner cylinder provides a convex part adjacent to said shroud part the convex part and said shroud part defining the engagement groove.

5. A relay device as claimed in claim 4, wherein both said shroud part and said engagement groove are shaped as a step.

* * * * *